Patented Oct. 10, 1950

2,525,474

UNITED STATES PATENT OFFICE 2,525,474

METHOD FOR PREPARING AMMONIUM ZIRCONIUM SULFATE SALT

Warren B. Blumenthal, Niagara Falls, N. Y., assignor to National Lead Company, New York, N. Y., a corporation of New Jersey No Drawing. Application May 18, 1949, Serial No. 94,057

2 Claims. (Cl. 23—117)

This invention relates to the manufacture of soluble zirconium salts and more particularly to the manufacture of ammonium zirconium sulphate salt compositions.

The general art of producing water soluble zirconium salts has not been well developed. The formation of soluble zirconium salts such as zirconium chloride and zirconium sulphate has not proved to be a simple process since zirconium oxide ($ZrO_2$) does not readily react with hydrochloric or sulphuric acids. Sulphuric acid, for instance, reacts with zirconia only at elevated temperatures, and prolonged heating is required to obtain optimum yields which are generally not high. The sulphate product so produced is hard and glassy and is difficult to remove from reaction vessels. No agent has been found to catalyze this reaction and no success has apparently attended efforts to solve the mechanical problems involved. Fusion of zirconia with alkali bisulphates yields a water soluble zirconium sulphate but this reaction requires much excess of bisulphate to achieve good yields. In this method, the product is found contaminated with the alkali used in the fusion, which cannot readily be separated. Some success has attended the production of zirconium sulphate by treating zirconium cyanonitride with sulphuric acid.

This process, while producing a soluble zirconium sulphate, suffers from several disadvantages particularly difficulty of grinding the cyanonitride to suitable particle size and the physical difficulties of handling the hard massive cake which results from the reaction.

This invention, therefore, has for its principal object the production of water soluble sulphate salts of zirconium by a simple economical process from zirconia ($ZrO_2$). It is a further object of this invention to produce a double salt, an ammonium zirconium sulphate according to the formula $(NH_4)_2H_2ZrO(SO_4)_3$. Another object of the invention is to provide a simple, efficient method for the production of ammonium zirconium sulphate salt compositions which are substantially water soluble.

This invention, in its broadest aspects, contemplates reaction at elevated temperatures between ammonium sulphate and zirconia ($ZrO_2$) to produce novel soluble ammonium zirconium sulphate salt compositions. The ammonium sulphate and zirconia are individually finely ground and thoroughly mixed together in proportion of from 2 to about 3.5 moles of ammonium sulphate to 1 mole of zirconium oxide. The mixture is heated to between 400° and 600° C. for a sufficient time for the entire mass of the reactants to attain the desired temperature and then to remain at this temperature for from about 5 minutes to 2 hours. During the heating, the reactants soften to a semi-liquid mass then set to a firm but pulverulent solid. This product is allowed to cool to room temperature and may then be milled to any desired degree of fineness.

The product is a substantially water soluble zirconium salt composition consisting essentially of combined ammonium, hydrogen, zirconium oxide, and sulphate radicals within the following limits by weight:

| | Per cent |
|---|---|
| $NH_4$ | from 2 to 12 |
| H | up to 0.7 |
| ZrO | from 20 to 30 |
| $SO_4$ | from 55 to 70 |

The starting material in this process may be crude zirconia ($ZrO_2$) which is available as the mineral baddeleyite or as a commercial product prepared by any one of several well-known processes. The ammonium sulphate raw material may be of an ordinary commercial grade. Both these materials are employed in comminuted form and preferably should be finely ground, a fineness of about 325 mesh being suitable; and thoroughly intermixed.

The proportions of the raw materials may vary over a range of from about 2 to about 3.5 moles of ammonium sulphate to 1 mole of zirconium oxide.

It is preferred, however, that the raw materials be taken so that for each mole of zirconium oxide there will be present 3 moles of ammonium sulphate. Combinations of these proportions of ingredients, are furnaced preferably at a temperature between 400° C. and 500° C. for a period of between 10 to 40 minutes, to produce a salt containing:

| | Per cent |
|---|---|
| $NH_4$ | 8.4 |
| H | 0.5 |
| ZrO | 24.7 |
| $SO_4$ | 66.4 | and which may be represented by the formula $(NH_4)_2H_2ZrO(SO_4)_3$. It is postulated that the reaction in this case proceeds as follows:

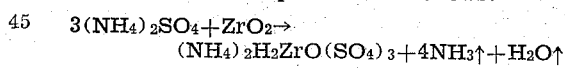

The equation represents the observation that ammonia and water are volatilized during the reaction, and a soluble product of the indicated composition is recovered.

The term "substantially water soluble" is used in this specification to mean that the reaction product is entirely soluble in water and only impurities remaining from the raw materials constitute a small insoluble contamination which will not generally exceed 10%. Following the preferred procedure according to this invention a product will be obtained of which 95% dissolves in water.

During the manufacture, if excess heating occurs, either locally or generally, varying additional amounts of NH₃ and H₂O, and also SO₃ are lost from the molecule resulting in a wide range of empirical compositions. If it is desired to produce salt compositions within the disclosed range having more or less ammonium, water or sulphate content, suitable adjustment in the degree of heating and length of the heating cycle may obviously be made to produce various compositions as desired.

To produce the preferred composition, that is $(NH_4)_2H_2ZrO(SO_4)_3$ it is necessary that the reactants be heated under conditions so that the desired amounts of volatile compounds are lost from the furnace charge. This may be accomplished by heating the finely ground and intermixed reactants in thin layers, preferably between ⅛" and ½" thick for a period of time varying from about 10 to 40 minutes. The optimum temperature for the reaction is about 450° C. and it has been found that below 400° C. and above 600° C. poor yields make the process uneconomical. It is likewise indicated that if the product is heated too long, part of the yield is lost due to decomposition, while if not heated long enough, insufficient reaction occurs. Too thin layers of reactants show unsatisfactory yields due to decomposition while layers in the furnace which are too thick react too slowly with resulting loss of equipment efficiency. One-quarter to one-half inch layers are preferred. The greater the proportion of ammonium sulphate in the raw material, the more zirconia is converted, but for reasons of economy, the most satisfactory ratio is about 3 moles of ammonium sulphate to 1 of raw zirconia.

It is postulated that during the reaction, the hydrogen in the zirconium acids $H_2ZrO(SO_4)_2$ and $H_4ZrO(SO_4)_3$ may be partially or wholly replaced by ammonium radicals. During the heating, ammonia, SO₃, and water may be driven off in varying amounts to produce salt compositions within the range of analysis indicated, and may contain one or several of these compounds.

In order that this invention may be more clearly understood, the following examples are shown:

Example 1

123.2 gm. of a technical grade of zirconium oxide, 325 mesh, was mixed thoroughly with 396.4 gm. of a technical grade of ammonium sulphate.

The mixture was spread in layers ¼–½" thick in stainless steel trays and held for thirty minutes in a muffle furnace at a temperature of 475° C. The product was then removed from the furnace, allowed to cool to room temperature, and pulverized in a hammer mill.

The product was found to consist of the white, water soluble compound $(NH_4)_2H_2ZrO(SO_4)_3$ together with 5% of insoluble impurities.

Example 2

The same mixture as employed in Example 1 was spread in layers 1½" thick in stainless steel trays and held for 60 minutes at 500° C. The product was then removed from the furnace, allowed to cool to room temperature and pulverized in a hammer mill.

The product was found to consist of the white water soluble compound $(NH_4)H_3ZrO(SO_4)_3$ together with 5% of insoluble impurities.

The percentage composition of the products of Examples 1 and 2 was as follows:

|  | Example 1 | Example 2 |
| --- | --- | --- |
|  | Per cent | Per cent |
| NH₄ | 8.4 | 4.3 |
| H | 0.5 | 0.7 |
| ZrO | 24.7 | 25.7 |
| SO₄ | 66.4 | 69.3 |

The products of this invention are ammonium zirconium sulphate salt compositions which are substantially pure and white and which may, if desired, be readily converted to other white zirconium chemicals which are useful in manufacturing gas mantles, water-repellents and other products. The ammonium zirconium sulphates form clear, colorless solutions with water and do not undergo decomposition on boiling. This is an advantage over zirconium sulphate as produced by previously known methods which tends to hydrolyze to some degree in water, particularly in dilute solutions, yielding insoluble hydrolysates. The process of this invention is simple, requiring but a single operation on the mixture of raw materials i. e. heating. This results in excellent economy of production. It is both possible and practical to furnace the mixture of raw materials according to this invention in a moving hearth furnace, for instance, and so produce the desired products continuously.

While this invention has been described and illustrated by the example shown, it is not intended to be limited strictly thereto and other modifications and variations may be employed within the limits of the following claims:

I claim:

1. A process for production of an ammonium zirconium sulphate salt composition which comprises intermixing comminuted ammonium sulphate and comminuted zirconium oxide in proportion so that for each mole of zirconium oxide there are present from 2 to 3.5 moles of ammonium sulphate and heating the so-formed mixture at a temperature of between about 400° and 600° C. for a period of between about 5 minutes to 2 hours.

2. A process for production of an ammonium zirconium sulphate salt composition which comprises intermixing comminuted ammonium sulphate and comminuted zirconium oxide in proportion so that for each mole of zirconium oxide there are present 3 moles of ammonium sulphate and heating the so-formed mixture at a temperature of between 400° and 500° C. for a period of between about 10 to about 40 minutes.

WARREN B. BLUMENTHAL.

REFERENCES CITED

The following references are of record in the file of this patent:

UNITED STATES PATENTS

| Number | Name | Date |
| --- | --- | --- |
| 1,540,425 | Ryan | June 2, 1925 |
| 2,264,414 | Sommerville et al. | Dec. 2, 1941 |

OTHER REFERENCES

Mellor: "Treatise on Inorganic and Theoretical Chemistry" (1927), vol. 7, page 159.

Gmelin-Krauts: "Handbuch des Anorganischen Chemie" (1928), vol. 6, Part 1, pages 27, 718 and 719.